US009284009B2

(12) United States Patent
Raike, III et al.

(10) Patent No.: US 9,284,009 B2
(45) Date of Patent: Mar. 15, 2016

(54) SAND-RIDEABLE BICYCLE WITH POSITIVE TRACTION GEAR ASSEMBLY

(71) Applicants: William J. Raike, III, Woodstock, GA (US); Gene Langmesser, Santa Ana, CA (US)

(72) Inventors: William J. Raike, III, Woodstock, GA (US); Gene Langmesser, Santa Ana, CA (US)

( * ) Notice: Subject to any disclaimer, the term of this patent is extended or adjusted under 35 U.S.C. 154(b) by 0 days.

(21) Appl. No.: 14/216,374

(22) Filed: Mar. 17, 2014

(65) Prior Publication Data

US 2014/0197616 A1 Jul. 17, 2014

Related U.S. Application Data

(63) Continuation-in-part of application No. 13/694,759, filed on Jan. 2, 2013, now Pat. No. 8,672,339, which is a continuation of application No. 13/317,389, filed on Oct. 17, 2011, now Pat. No. 8,382,135.

(51) Int. Cl.
| | |
|---|---|
| *F16D 11/00* | (2006.01) |
| *B62K 17/00* | (2006.01) |
| *F16D 11/04* | (2006.01) |
| *B62K 3/06* | (2006.01) |
| *B62M 29/00* | (2006.01) |
| *B62K 3/02* | (2006.01) |
| *B62K 3/04* | (2006.01) |
| *B60C 11/00* | (2006.01) |
| *B62M 9/02* | (2006.01) |

(52) U.S. Cl.
CPC ................. *B62K 17/00* (2013.01); *B60C 11/00* (2013.01); *B62K 3/02* (2013.01); *B62K 3/04* (2013.01); *B62K 3/06* (2013.01); *B62M 9/02* (2013.01); *B62M 29/00* (2013.01); *F16D 11/00* (2013.01); *F16D 11/04* (2013.01)

(58) Field of Classification Search
CPC ......... B62K 3/06; B62M 29/00; B60C 11/03; F16D 11/00; F16D 11/04; F16D 3/02; F16D 3/205; F16D 3/207; F16D 23/0606; F16D 23/0612
USPC ........... 280/28.5, 281.1, 12.14, 282; 180/205, 180/219; 73/146; 301/52, 43; 152/209.12, 152/209.13, 209.22, 209.11, 209.15; 192/66.1, 69, 69.4, 69.43, 41 R, 70.3, 192/85.1, 89.23, 89.24, 113.26, 24, 25
See application file for complete search history.

(56) References Cited

U.S. PATENT DOCUMENTS

| | | |
|---|---|---|
| D26,115 S | 9/1896 | Seiberling |
| 1,083,115 A | 12/1913 | Mallory |
| 1,225,459 A | 5/1917 | Mauk |
| D87,419 S | 7/1932 | Smith |
| D117,175 S | 10/1939 | Hardeman |
| D122,391 S | 9/1940 | Delzell |
| 2,323,261 A | 6/1943 | Vigo |
| 2,403,309 A | 7/1946 | Smith |

(Continued)

FOREIGN PATENT DOCUMENTS

KR 2010005893 U 6/2010

*Primary Examiner* — Joseph Rocca
*Assistant Examiner* — Daniel Yeagley
(74) *Attorney, Agent, or Firm* — Thomas | Horstemeyer, LLP

(57) ABSTRACT

An unmotorized sand-rideable bicycle utilizes oversized balloon tires that have an enlarged footprint to permit the bicycle to ride up over even loose sand to provide ease of pedaling, as well as enhanced steering and stability over that associated with standard bicycles. A positive traction gear assembly may be employed to switch between single and dual rear wheel drive.

20 Claims, 10 Drawing Sheets

(56) References Cited

U.S. PATENT DOCUMENTS

| | | | |
|---|---|---|---|
| 2,650,632 A | 9/1953 | Langdon | |
| 2,787,970 A | 4/1957 | Bennett | |
| 2,812,031 A | 11/1957 | Aghnides | |
| 2,819,751 A | 1/1958 | Frary et al. | |
| 2,837,342 A * | 6/1958 | Kirk | 280/1.189 |
| 3,336,037 A | 8/1967 | Brozovich | |
| 3,542,145 A | 11/1970 | Proffer et al. | |
| 3,677,571 A | 7/1972 | Maturo, Jr. et al. | |
| 3,679,227 A | 7/1972 | Rock | |
| 3,710,883 A | 1/1973 | Rizzo | |
| 3,817,555 A | 6/1974 | Kennedy | |
| 3,893,527 A * | 7/1975 | Walker et al. | 180/183 |
| 3,931,973 A | 1/1976 | Moe | |
| 4,077,351 A | 3/1978 | Girona | |
| 4,132,428 A | 1/1979 | Lassiere | |
| 4,253,512 A | 3/1981 | Yoshioka et al. | |
| 4,341,249 A | 7/1982 | Welter | |
| 4,392,536 A | 7/1983 | Iwai et al. | |
| 4,553,652 A * | 11/1985 | Fallos | 192/18 R |
| 4,647,067 A | 3/1987 | Paquette et al. | |
| 4,909,537 A | 3/1990 | Tratner | |
| 5,178,088 A | 1/1993 | Howard | |
| 5,474,144 A | 12/1995 | Tarng | |
| 5,611,555 A | 3/1997 | Vidal | |
| 6,146,237 A | 11/2000 | Rehkemper et al. | |
| D449,570 S | 10/2001 | Lo | |
| 6,443,466 B2 | 9/2002 | Trubiano | |
| 6,532,812 B2 | 3/2003 | King | |
| 6,712,371 B2 | 3/2004 | Trubiano | |
| 6,968,933 B2 * | 11/2005 | Buckhouse et al. | 192/69.4 |
| 7,114,539 B2 | 10/2006 | Townsend | |
| D545,245 S | 6/2007 | Masera | |
| 7,597,331 B2 | 10/2009 | Schulte et al. | |
| 8,186,698 B2 * | 5/2012 | Gunderson | 280/210 |
| 8,382,135 B1 | 2/2013 | Raike, III et al. | |
| 2005/0029031 A1 | 2/2005 | Thomas | |
| 2006/0108768 A1 | 5/2006 | I et al. | |
| 2007/0222278 A1 | 9/2007 | Hoisington | |
| 2009/0205414 A1 | 8/2009 | Vassilieff et al. | |
| 2012/0242058 A1 | 9/2012 | Haimoff et al. | |
| 2013/0119631 A1 | 5/2013 | Raike, III et al. | |
| 2015/0001828 A1 * | 1/2015 | Silva | 280/259 |

\* cited by examiner

SAND-RIDEABLE BICYCLE WITH POSITIVE TRACTION GEAR ASSEMBLY

CROSS-REFERENCE TO RELATED APPLICATIONS

This application is a continuation-in-part of, and claims priority to, co-pending U.S. Patent Application entitled "SAND-RIDEABLE BICYCLE," filed on Jan. 2, 2013, and assigned application Ser. No. 13/694,759, which is a continuation of, and claims priority to, U.S. Patent Application entitled "SAND-RIDEABLE BICYCLE," filed on Oct. 17, 2011, and assigned application Ser. No. 13/317,389, which issued as U.S. Pat. No. 8,382,135 on Feb. 26, 2013, which are incorporated herein by reference in their entireties.

FIELD OF THE INVENTION

This invention relates to bicycles and more particularly to a sand-rideable bicycle with oversized tires, the large footprint of which prevents the tires from sinking into the sand.

BACKGROUND

With the growth of an aging population especially in retirement communities around beaches, there is a requirement that the individual be able to ride a bike from his or her residence to a beach and be able to traverse the beach on the bicycle without undo propulsion and balance problems.

While dune buggies and like motorized vehicles exist, there is a problem with utilizing standard bicycles on a beach due to the difficulty in riding such a bike, including getting it going, and also steering it as well as keeping it upright. This is because on loose sand as well as in wet sand conditions the effort to propel the bike is often insurmountable with other than Herculean effort.

The obvious reason is that the bike tires of a conventional bicycle sink into the dry sand making propulsion, balancing and steering impossible for a large number of individuals. It turns out that the peddling on dry sand is exceedingly difficult, requiring extreme use of leg strength even in the lowest gear.

Moreover, balancing a traditional bike on sand is difficult due to the sands unstable foundation.

Even with compacted dry sand, while there is considerable difficulty in starting up, once movement is commenced it is less difficult to stay balanced and ride for a considerable distance. However, even with dry compacted sand standard bicycles sink into the sand for as much as two inches. Moreover, even if one can propel the bicycle, steering is difficult in any direction aside from straightforward due to the sinkage into the top layer of sand, for instance on an average of 1½ inches.

On wet or semi compacted sand a conventional bicycle is likewise difficult to peddle and steer. Stopping and starting repeatedly over for instance a distance of 10 to 12 feet is difficult due to the inability to get the bike started again, requiring great strength. Moreover in wet or semi compacted sand the rear tire of the bicycle does not achieve good traction. Additionally, on wet and compacted sand front tire sliding is a cause for bike instability resulting in the impossibility of an individual to balance on the bike.

Thus for conventional bikes, even those defined as mountain bikes, riding on sand be it loose sand, dry compacted sand, or wet and semi compacted sand is exceedingly difficult under human-power. Even if motorized attachments are made to the bicycle, balancing and steering is still a problem, with the motorization only solving the propulsion problem. Note, the majority of beaches do not allow motorized vehicle to be driven on the beaches except by law enforcement personnel.

While motorized dune buggies and the like have been provided in the past, it will be appreciated that these vehicles are four wheel vehicles which have a four point stance and therefore are relatively stable. These vehicles are not readily adapted for human peddling and were devised because of the inability to take a conventional bicycle and peddle it through the sand. Thus, drivability of conventional bicycles over various beach conditions has proved either impossible or very difficult at best.

There is therefore a need for a different bicycle design that can be peddled by a human being with ease, in which propulsion, steering and balance problems are minimized.

SUMMARY OF INVENTION

In one embodiment of the subject invention, a sand-rideable bicycle is provided with oversized tires such that the footprint of the tire is expanded considerably over that associated with standard bicycles. Note, the footprint of a standard mountain bike is on the order of 2 inches in width with a 210 lb. rider. On the other hand, in one embodiment the footprint of an oversized tire with a 210 lb. rider is on the order of 8×12 inches. Note also that riderless standard mountain bikes have a footprint width of 1 inch, whereas the subject balloon tires have a riderless footprint width of 6 inches.

The result is that the tire does not sink into the sand to any great extent, thus permitting peddling without the resistance of having to push aside a large amount of sand as one rides. Secondly, the oversized tires provide increased steering ability due to the relatively fat flattened footprint as the front tire meets the sand. This is coupled with rear tire stability that prevents the sideways motion associated with a conventional bike tire making its way through loose or compacted sand.

The oversized tires and in some cases the under inflation of the tire permits the individual to initiate peddling and steering without the strength normally utilized to peddle a conventional bike through sand. The reason that the initial peddling is made easier is that the amount of sand that needs to be displaced for the bicycle to move forward is minimized, thus permitting the gyroscopic action of the wheels to take effect as the bike moves forward, thus aiding in stability.

In one embodiment, the width of the tires is between 6" and 8" and the inflation of the tires is between 15# and 25# for tires having a diameter of 26" to 27" outside diameter.

As part of the subject invention, a lightweight open split frame is utilized in which the frame viewed from the top has a diamond shape. In this embodiment the peddles are laterally displaced to either side of the split frame, with the chain drive sprocket existing totally within the frame, as opposed to on the side as with conventional bicycles.

This lateral spacing of the peddles to either side of the bifurcated frame permits easier peddling and balancing due to the wider stance when peddling.

Additionally, the frame may be made partially of metal alloy and partially of carbon fiber, with the carbon fiber being utilized for the fork that is utilized to support the front wheel. The remainder of the bicycle in one embodiment is made of titanium due to its light weight. Moreover, titanium limits corrosion associated with salt air and one does not have to paint the titanium frames. Any logos or the like may be applied to the titanium frames as stickers.

Moreover, in one embodiment, the rear drive tire is provided with an annular ridge that rises up above the lateral ridges used for propelling the bike forward. This permits the bike to be ridden on normal streets without the clatter associated with the rather large lateral ridges used for sand propulsion. As a result it is possible for an individual to ride comfortably from one's residence to the beach and onto the beach, with the bike being supported above its laterally running rear tire ridges by the annular protruding ridge.

In one embodiment, only two to three gears (low, med, high) are provided for the forward propulsion of the bicycle, namely a low gear ratio to be utilized when peddling through sand and a larger gear ratio to be utilized when peddling the bicycle along a street or walkway. In one embodiment, the low gear ratio is on the order of 1.5:1. This is accomplished in one embodiment through a 25.5 inch drive sprocket gear which for 500 revolutions permits one to go 1000 meters given an outside wheel diameter of 26".

In one embodiment, the width of the forward wheel is between 4-6 inches and the width of the rear wheel is on the order of 8 inches, with the tire in one embodiment having a 26 to 27 inch outside diameter.

In the above embodiment one has a difference in width on the tires because there is very little weight on the front tire, with most of the weight being born by the rear tire when one is sitting on the bicycle seat.

It is desirable to keep the tire weight to a minimum and have a differential in width between the front and the back tires to minimize weight. However, the width of the tire cannot be decreased so much as to result in the tire penetrating deep into the sand which limits drivability.

Moreover, rather than utilizing the normal 35 pounds of tire pressure, in one embodiment the tire pressure is reduced to 15 pounds so as to increase the footprint of the tire on the sand, thereby limiting the penetration of the tire into the sand. This also prevents sideways motion as little sand is kicked off to either side of the tire.

Additionally, in another embodiment the rear tire is composed of two side-by-side tires that increases balance and stability while at the same time providing for an even wider footprint. Since two tires are separated a sprocket gear may be provided in between. Since the main drive sprocket gear is located centrally in the frame, it can be lined up with the sprocket gear between the two tires.

Returning now to the gear ratios, it will be appreciated that a 1:1 gear ratio means that one is peddling at full revolution of the peddles for maybe a quarter of a stride of a walk. What this means is that one has to peddle four revolutions to equal one stride. This means that the gear ratio of 1:1 is somewhat low. It has been found that a 1.5:1 ratio is satisfactory for low gear.

In summary, the above gear ratio is sufficient and low enough to where anyone of average strength can peddle the bike because of the tire not sinking into the sand, even when one encounters a bit of soft sand. Moreover, drivability is enhanced because of the low gear ratio, the bicycle's agility and lightness enables one to propel oneself forward with ease, with the size of the balloon tires helping with propulsion and balance. It is noted as long as one can move forward, one can continue to maintain ones balance.

One of the desirable features of the subject bicycle is to create a machine that an overweight person can utilize on a beach. Retirees are not necessarily in the best of shape and may be overweight, with the subject bicycle replacing walking as convenient and enjoyable exercise so that the retiree can ride up and down the beach, get the same exercise as walking, go a lot faster and burn more calories.

In short, the oversized or balloon tires and their enlarged footprint permit the bicycle to ride over even loose sand, while at the same time aiding in steering and stability.

BRIEF DESCRIPTION OF THE DRAWINGS

These and other features of the subject invention will be better understood in connection with the Detailed Description, in conjunction with the Drawings, of which:

FIG. 4 is a cross sectional and diagrammatic illustration of the rear balloon tire of FIG. 1 illustrating the laterally running ridges used for the propulsion of the bicycle, also illustrating the annular circumferential ridges that permit riding of the bicycle on streets, pavement and the like.

DETAILED DESCRIPTION

Prior to describing the functionality and the operation of the subject sand-rideable bicycle, the following relates to research data collected when several different individuals were instructed to use a mountain bike and more particularly a mountain bike called a Motive Ground Pounder having an aluminum suspension frame in which the particulars of the test are listed below:

Subjects

Difficulty of riding was tested by four participants:
1.) male, 53 years old, 210 lbs, 5'11"
2.) male, 19 years old, 170 lbs, 5'9"
3.) male, 16 years old, 130 lbs, 5'9"
4.) female, 43 years old, 117 lbs, 5' 1"

Measures

Three conditions were tested: dry/loose sand; dry/compacted sand; wet/semi-compacted sand. Each condition was attempted for three tries each subject and the arithmetic mean was taken.

Findings

The bike was very difficult to ride, steer, and keep upright for all subjects in dry, loose sand as well as wet sand conditions. In compacted sand conditions the riding ability more then doubled but was still difficult to steer.

Dry/Loose Sand:

the sinking into the dry sand made steering impossible for all subjects for a measurable distance. Conditions for peddling on dry sand were difficult and required extreme use of leg strength even in lowest gear. Balancing the bike was difficult due to the sand's unstable foundation.

Dry/Compacted Sand:

subjects differed in ability to ride in compacted sand.

Subject 1.) difficulty in starting but once movement was commenced, it was less difficult to stay balanced and could ride for a considerable distance; sunk into sand layer for 2 inches;

Performance of subject 3.) was notably better than rest of subjects. Could balance, but still had difficulty steering bike in any direction aside straight forward and sunk into top layer of sand on an average of 1~inches; could ride it for considerable distance. Subject 2.) and 4.) had comparable results to subject 1.)

Wet/Semi-Compacted Sand:

Subject 1.) had difficulty peddling and steering; very difficult to pedal and steer; Stop and start repeatedly over a length of 10-12 feet, but able to ride with extreme difficulty and great use of strength required. Rear tire sunk only 1 inch into the sand but due to sand's moisture level good traction was not achieved. Front tire sliding and cause for impossible to balance condition.

Subject 2.) and 3.) difficult in pedaling and steering; unable to consider ease to ride for more than 20 feet measurable length continuously; rear tire sunk 1¾ inch into the sand; front tire was uncontrollable for steering.

Subject 4.) unable to ride—lack of strength to initiate pedaling and steering for any measurable length.

Conclusion

The mountain bike was difficult to pedal or was unusable in the above listed sand conditions.

The Sand-Rideable Bicycle

Figure 1:
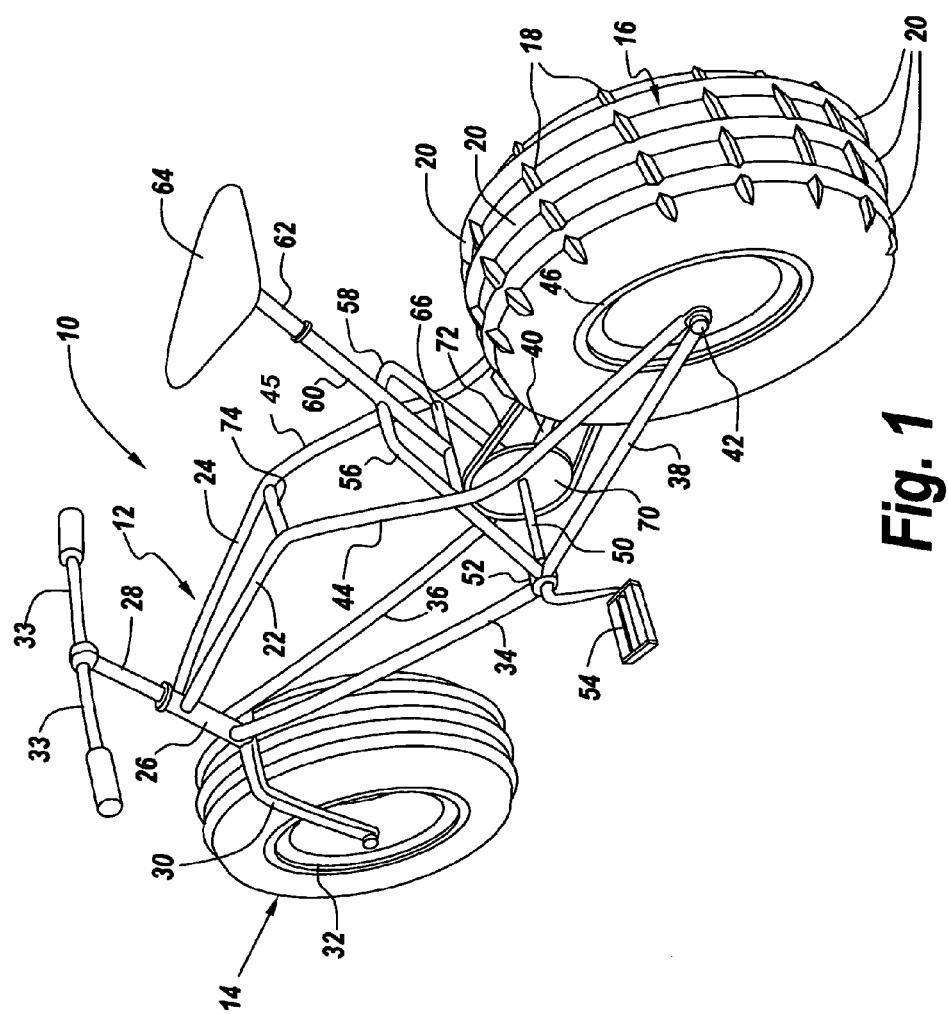
FIG. 1 is an isometric view of the subject sand-rideable bicycle indicating oversized tires, an open frame enclosing the drive gear in which the rear tire is provided with an annular ridges that extend beyond lateral propulsion ridges to permit riding of the bicycle on pavement.

With the difficulty of riding conventional bicycles in sand, and referring now to FIG. 1, a sand-rideable bicycle 10 includes a frame 12 on which are supported balloon tires 14 and 16, with the forward tire containing circumferential ridges for tracking and in which the rear tire 16 is provided with propulsion ridges 18 that run transverse to the direction of travel of the bicycle. Also shown is a circumferential ridge 20 which extends above the lateral ridges 18 so that when the bicycle is ridden over asphalt, concrete or the like there is no jarring action to the rider.

However, when riding on a soft sand surface ridges 18 provide sufficient dig and propulsive force to be able to propel the individual on the bicycle forward even through the softest and most loosely packed of sand.

It is noted that the frame for the subject sand-rideable bicycle is an essentially diamond shaped frame in which bifurcated upper struts 22 and 24 extend from a column 26 adapted to house a steering shaft 28 to which handles 33 are attached as shown.

Shaft 28 is provided with an expanded fork 30 having a width to accommodate the oversized wheel or hub 32 onto which balloon tire 14 is mounted.

Bifurcated lower struts 34 and 36 are spaced from struts 22 and 24 and extend from column 26 rearwardly towards wheel 16, with lower strut extensions 38 and 40 running to an attachment point 42 for a hub 46 of wheel 16 which is used to mount the rear balloon tire.

Likewise extensions of struts 22 and 24, here illustrated at 44 and 45 are angled downwardly, with their distal ends meeting the ends of struts 38 and 40 to form a collar for the axle of oversized rear tire.

As illustrated, a drive sprocket axle 50 is mounted transverse to the frame through the use of collars 52, with axle 50 rotated by peddles 54 that extend to either side of the expanded frame.

As can be seen, seat mounting struts 56 and 58 extend upwardly from associated collars 52 where they are affixed to a tubular member 60 that is used to telescopically house a cylindrical shaft 62 which is capped by a seat 64.

The bottom of tubular member 60 is supported by a transverse spar 66 welded at either end to struts 56 and 58, with transverse spar 66 being welded to the bottom of tubular member 60 as illustrated.

It will be noted that axle 50 carries a drive sprocket or gear 70 which is housed totally within the frame structure and rests, not outside of the frame structure, but within it.

Figure 2:
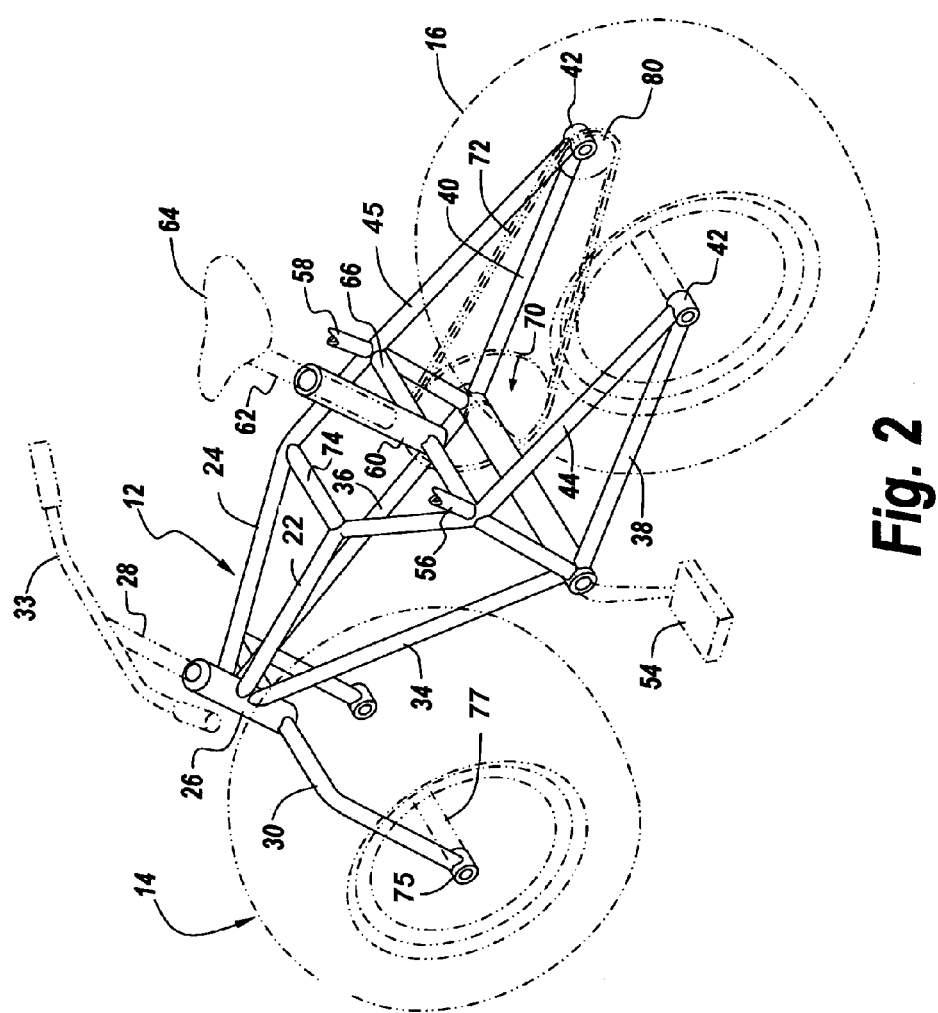
FIG. 2 is a diagrammatic illustration of the frame of the sand-rideable bicycle in FIG. 1 in which the frame accommodates oversized tires while at the same time providing a diamond shaped open structure for the attachment of a seat and for the mounting of a drive sprocket within the frame and actuated by foot peddles.

As shown in FIG. 2, a drive chain 72 is illustrated which is utilized to drive a sprocket 80 on rear wheel 16 such that the bicycle with the balloon tires is peddleable without a power assist by a wide variety of individuals seeking to ride the bike on a sand beach.

Referring back to FIG. 1, it is also noted that a spacer 74 is used to space the bifurcated struts 22 and 24 to maintain the bifurcated struts 22 and 24 in place.

Referring again to FIG. 2 where front tire 14 and rear tire 16 is shown in dotted outline, the various components of the diamond shaped frame are illustrated in which like elements have like reference characters between FIGS. 1 and 2.

Here it can be seen that fork 30 has enough clearance to accommodate front tire 14, with the fork shown here attached to front tire 14 through sleeves 75 into which fit a front tire axle 77.

In this picture sprocket 70 drives rear wheel sprocket 80 shown here in dotted outline.

Figure 3:
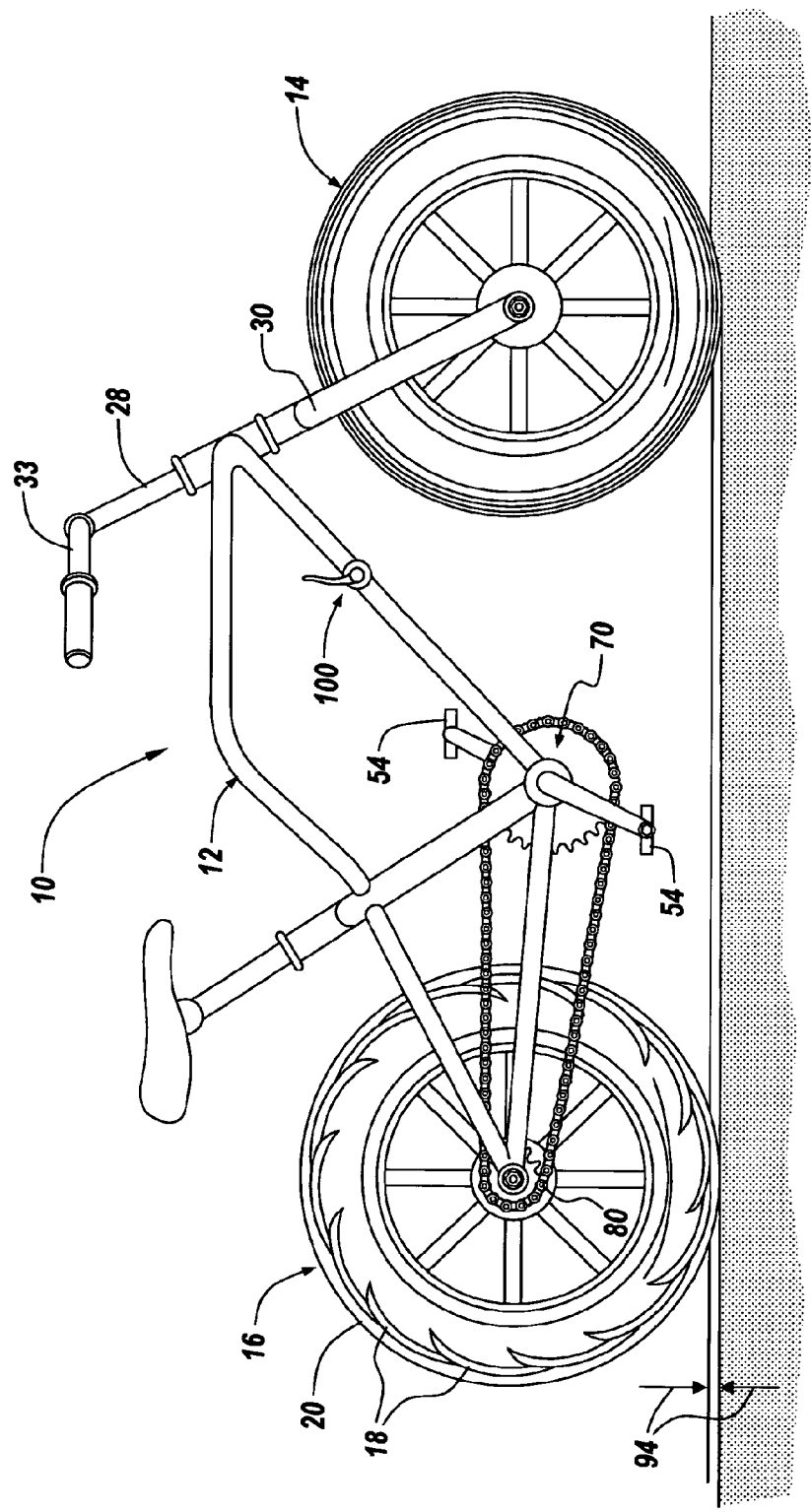
FIG. 3 is a side view of the sand-rideable bicycle of FIG. 1 illustrating the limited depth to which the tires of the bicycle penetrate into even soft sand, thereby to permit the riding of the bicycle on soft sand.

Referring now to FIG. 3, again in which like elements have like reference characters between FIGS. 1 and 2, here it can be seen that front tire 14 only depresses the surface 90 of loosely packed sand 92 by an amount indicated by double ended arrow 94, with the indenting of the soft sand being very slight indeed. It is the purpose of the balloon tires to make the bicycle sand peddleable by a wide variety of individuals without undue stress and to get the bicycle up and started easily so that the gyroscopic forces generated by the wheel rotating permit easy balancing.

As will be discussed hereinafter, the amount of depression of the sand varies by the weight of the rider and the composition and density of the sand. However it has been found with tires having a pressure of 15 pounds and a width of between 4 and 8 inches, even for a 300 pound individual result in minimal depression of the tires into the sand, making possible peddling of the bicycle without mechanized assistance.

In one of the tests described hereinafter, the distance that the tires penetrate into the sand, namely the distance described by arrow 94, is so slight that only a slight trace on the sand is seen after the bicycle has been ridden across the sand.

Of course, the ease with which the bicycle is peddled through the sand is dependent upon the gear ratio between sprocket 70 and sprocket 80, which in one embodiment in low gear is approximately 1.5:1. The drive sprocket and the rear mounted sprocket gear are shifted from one gear to another in a conventional manner and is therefore not shown. However, a gear shift is diagrammatically illustrated at 100 to be able to shift the gears through associated cables and the like when the rider goes for instance from an asphalt or concrete walkway to sand.

Figure 4:
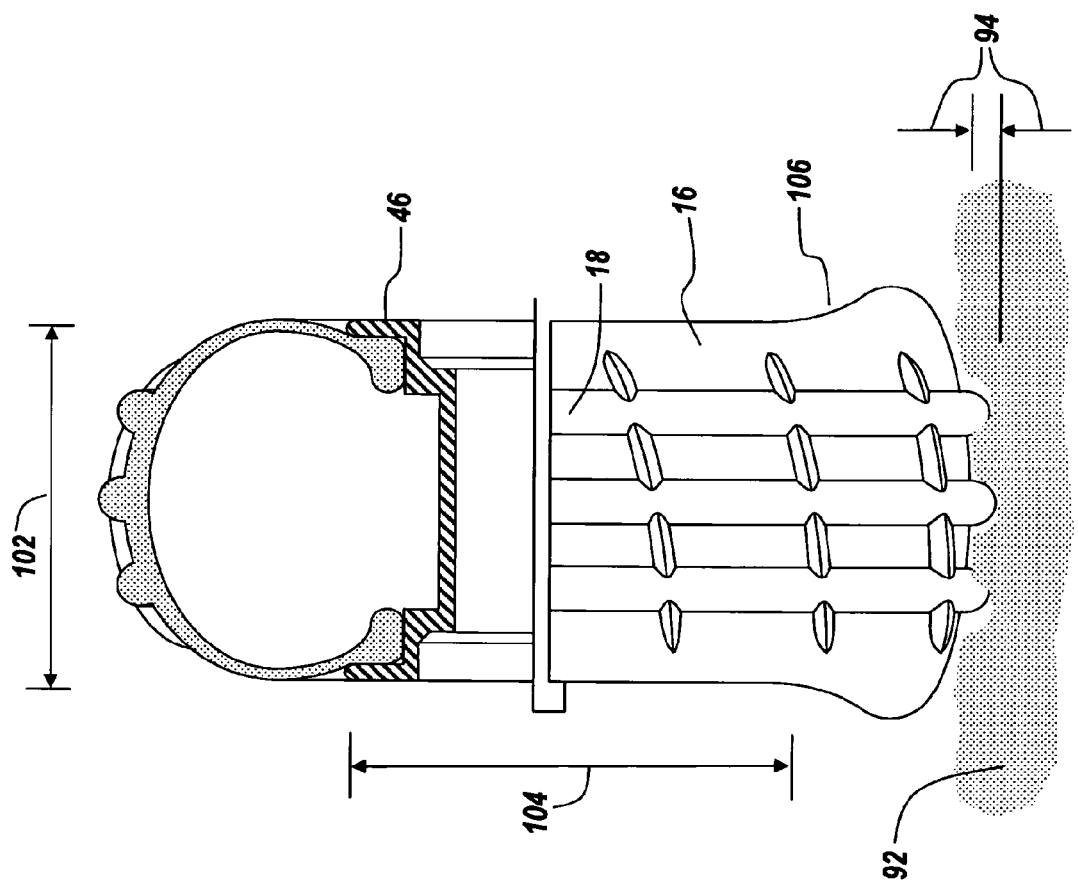

As will be discussed hereinafter, it has been found that it is possible to easily peddle the subject sand-rideable bicycle due to the aforementioned balloon tires, one of which is shown in FIG. 4. Here as can be seen the balloon tire has a width as indicated by double ended arrow 102 of between 8 and 10 inches, with the wheel having a hub diameter as indicated by double ended arrow 104 of 17 inches.

Hub 46 is illustrated in partial cross section to show its attachment to balloon tire 16, with the tire in one embodiment being under inflated to approximately 10 pounds such that the footprint of the tire is expanded by the bulbous portion 106 which expands the footprint of the tire on the sand.

The extent to which the rear tire sinks into the sand is illustrated by the aforementioned double ended arrows 94, it being understood that the inflation of the tires may be adjusted to provide a sufficient footprint for easy peddling based on the weight of the rider.

While the weight of the rider is paramount in the degree to which the bicycle sinks into the sand, not only is the inflation of the tires critical in terms of sand penetration, but also the structure of which the frame is made contributes to how heavy the bicycle is, regardless of the rider's weight.

In one embodiment the fork is made out of carbon fiber for the weight control, whereas frame components may be made of titanium to increase strength and rigidity while at the same time minimizing the amount of weight contributed by the frame itself.

It is noted that the ease with which the subject bicycle can be peddled is not only due to the balloon tires and the expanded footprint due to under inflation, the bifurcated frame assembly spaces peddles 54 in such a manner that an expanded peddling stance is provided. This expanded peddling stance makes peddling more natural, making bicycle propulsion easier.

Note the inclusion of the drive sprocket within the frame. This protects the drive sprocket from picking up loose sand assuming shielding is provided around the sprocket and anchored to this frame. Thus, the frame provides a framework from which sand shielding can be secured, thus making the sand-rideable bicycle somewhat more impervious to sand getting into the gears and gear chain.

Double Drive Wheels

Figure 5:
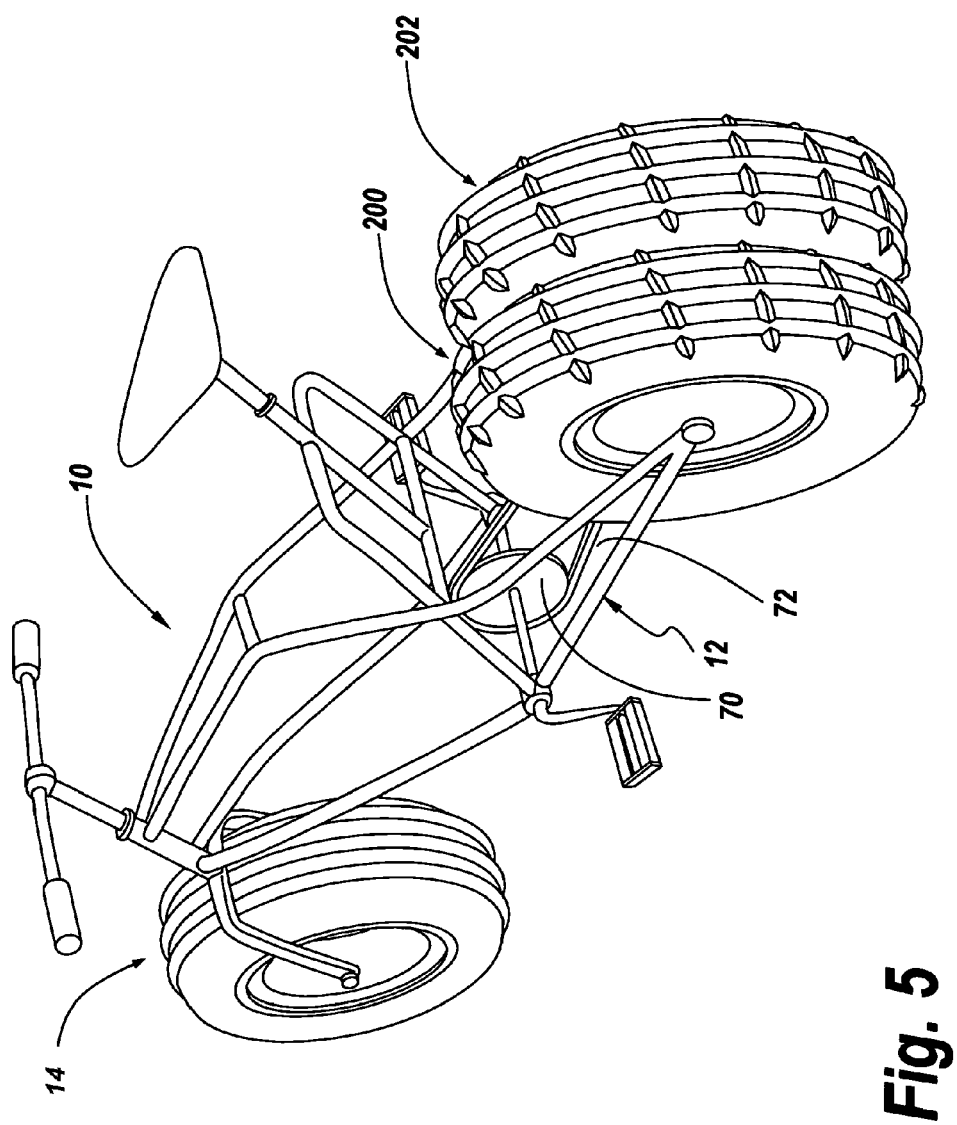
FIG. 5 is an isometric view of the subject bicycle with a pair of side-by-side rear tires.

Referring now to FIG. 5, a double drive wheel version of the subject invention is shown in which bicycle 10 is shown with a pair of wheels 200 and 202 mounted to frame 12. The side-by-side mounting of the tires provides a number of advantages. First, there is an increased footprint, which again serves the purpose of preventing sand penetration that makes the bike rise up and float over the sand.

Secondly, the side-by-side double tire version provides for increased stability due to the wide stance of the tires, making balancing easier, especially for those older individuals having balance problems. The side-by-side double wheel version permits easy mounting of the bicycle when stationary, and provides stability regardless of forward motion which would create gyroscopic stability.

Thus, mounting the bicycle at extremely low forward speeds is possible, even for the most inexperienced bike rider or those experiencing balance problems.

Additionally, the increased footprint of the two tire version provides better traction in soft sand for effortless propulsion such that not only do the balloon tires cause the bicycle to ride up on top of the sand, they also provide both lateral stability and the ability to pedal the bicycle regardless of the softness of the sand.

Figure 6:
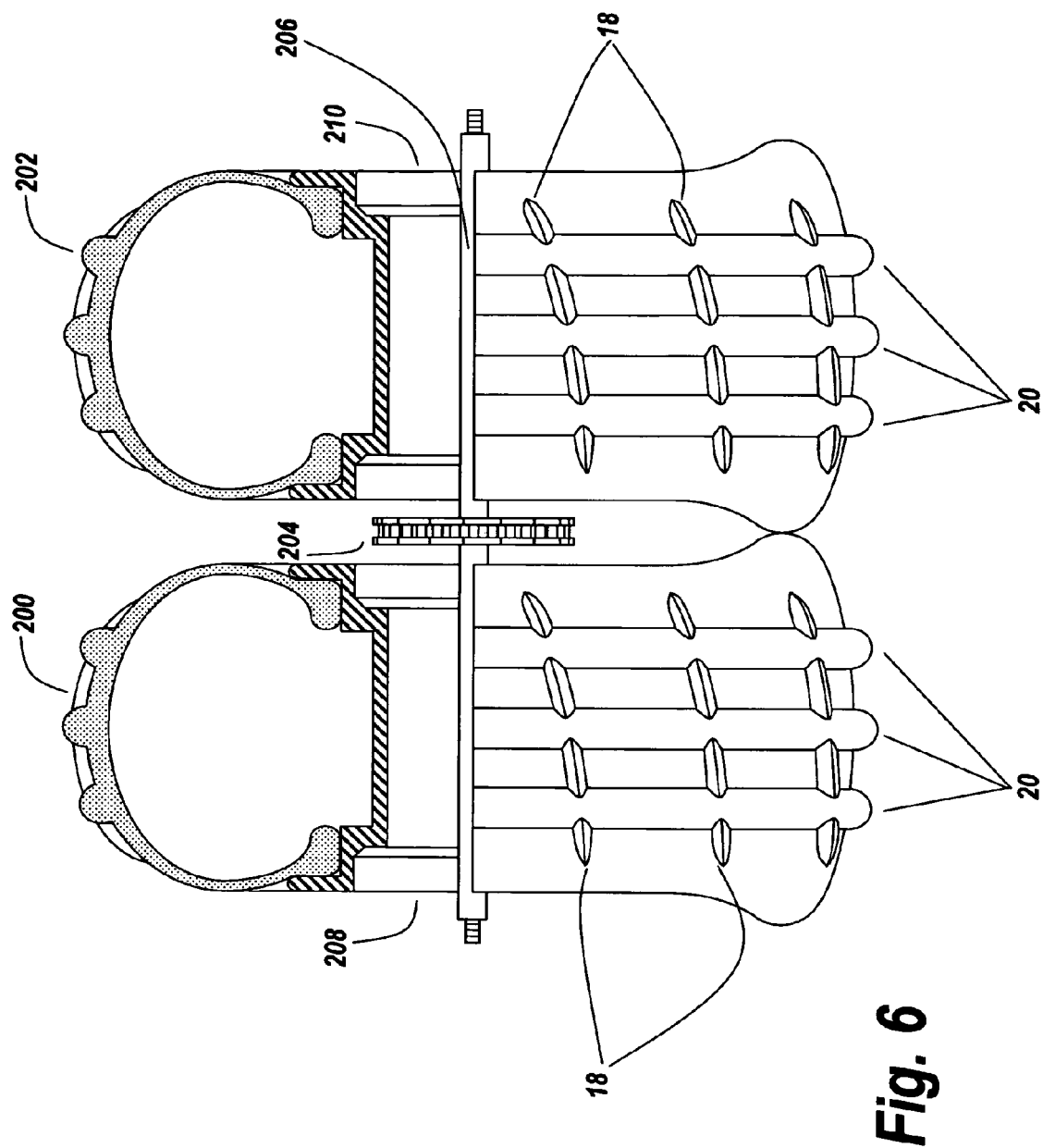
FIG. 6 is a cross sectional and diagrammatic illustration of the side-by-side rear tire structure of FIG. 5 showing a sprocket therebetween.

As shown in FIG. 5, the bifurcated structure of frame 12 permits location of drive sprocket 70 in the center of the frame that permits drive chain 72 to go between tires 200 and 202 where, as illustrated in FIG. 6, a rear drive sprocket 204 is located on a shaft 206 attached to the hubs 208 and 210 of respective tires.

The centered drive provides a centered torque system that even further aids in balance and pedaling stability.

It is noted that balloon tires 200 and 202 are provided with the laterally running ridges 18 such as discussed in FIG. 1. In order to make the bicycle rideable over city streets, sidewalks and the like, circumferential ridges 20 are provided to extend above the laterally running ridges to make street riding comfortable.

It should be noted that the circumferential ridges also aid in lateral stability such that when combined with the circumferential ridges on the front tire, provide good tracking in much the same way as a boat keel.

In summary, the sand rideable bike may be provided with a double rear tire assembly that makes the bike float over even loose sand with a type of stability not available on any conventional bicycle, much less one having balloon tires and designed for effortless sand pedaling.

Moreover, the utilization of the side-by-side tires provides for a more stabilized bike mounting and a diminution of the balancing requirements for an individual seeking to pedal the bicycle over sand.

Thus individuals who might be challenged from a balance point of view can none the less enjoy bicycling both on solid surfaces and over loose sand, regardless of balance impairments. This of course is critical when such balance-impaired individuals seek to bicycle over loose granular surfaces such as sand, gravel and the like, with the added stability of the two rear tire configuration enhancing the sand rideability of the FIG. 1-4 embodiment.

What is now presented is one example of the size of the tires, the weight of the individuals and the penetration of the bike into sand to illustrate all of the factors that are combined to calculate the amount that the bicycle sinks into the sand, and thus the ease of peddling. All of these factors are variable based on the weight of the individual which is one of the factors.

TABLE I

TEST RESULTS

| | |
|---|---|
| Bicycle Weight | 50 lbs. |
| Tire Size (Outside diameter) | 27" |
| Tire Width (Unloaded) | 6.3" |
| Tire Pressure | 15 lbs. |
| Footprint (riderless) | 6" × 9" |
| Footprint (210 lb. rider) | 8" × 12" |
| Loose Sand Depression (210 lb. rider) | ½ inch |

Although FIGS. 5 and 6 depict a pair of balloon tires 200, 202 that are side-by-side, these illustrations are not intended to be limiting. For example, in another embodiment, the balloon tires 200, 202 may be spaced apart by a certain distance in order to accommodate a cargo compartment.

Various embodiments of the present disclosure may incorporate a positive traction gear assembly 300 between the balloon tires 200 and 202. The positive traction gear assembly 300 facilitates locking and unlocking the balloon tire 200 with the balloon tire 202, with the effect of providing an option of single wheel drive or dual wheel drive. The use of single wheel drive may provide a decreased turning radius over dual wheel drive.

Figure 7:
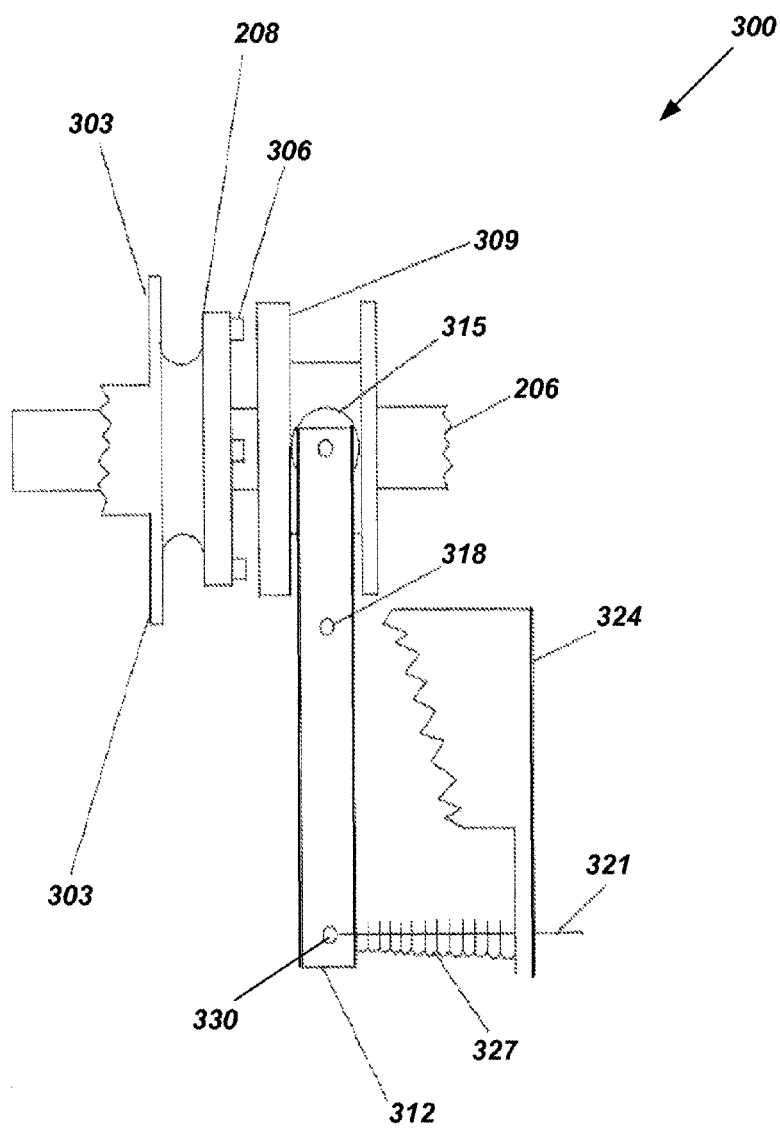
FIG. 7 illustrates a component view of one example of a positive traction gear assembly that may be used in a sand-rideable bicycle according to an embodiment of the present disclosure.

FIG. 7 illustrates a component view of one example of a positive traction gear assembly 300 according to an embodiment of the present disclosure. The positive traction gear assembly 300 includes an axle shaft 206 and a wheel hub 208 that has been modified relative to that shown in FIG. 6. The wheel hub 208 includes spokes 303 and drive screws 306. The balloon tire 200 of FIG. 6 (not shown in FIG. 7) is installed upon the wheel hub 208.

A drive plate 309 is keyed to the axle shaft 206 and locks and unlocks to the drive pins 306 of the wheel hub 208. The drive plate 309 may be coupled to a pivot arm 312 by way of a bearing 315. The pivot arm 312 may be configured to pivot about a pivot point 318. The action of the pivot arm 312 may be controlled by way of a cable 321 attached to the pivot arm 312. The cable 321 may pass through an arm and spring bracket 324 and through a spring 327. The cable 321 attaches to the pivot arm 312 at a cable attachment point 330.

Figure 8A:
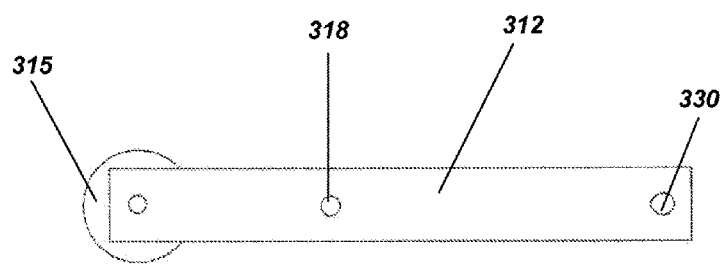
FIGS. 8A and 8B provide detail views of a pivot arm of the positive traction gear assembly of FIG. 7.
Figure 8B:
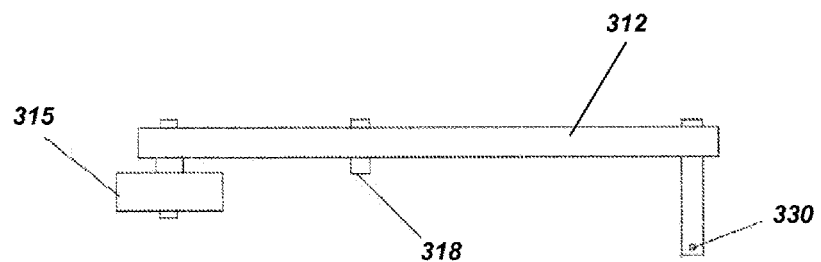

FIGS. 8A and 8B provide detail views of the pivot arm 312 of FIG. 7, including the bearing 315, the pivot point 318, and the cable attachment point 330. FIG. 8A shows the view of the pivot arm 312 as in FIG. 7, while in FIG. 8B, the pivot arm 312 is shown rotated longitudinally by 90 degrees.

Figure 9A:
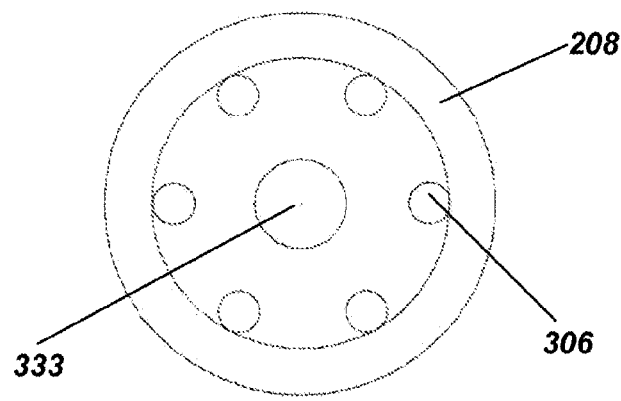
FIGS. 9A and 9B provide detail views of a wheel hub of the positive traction gear assembly of FIG. 7.
Figure 9B:
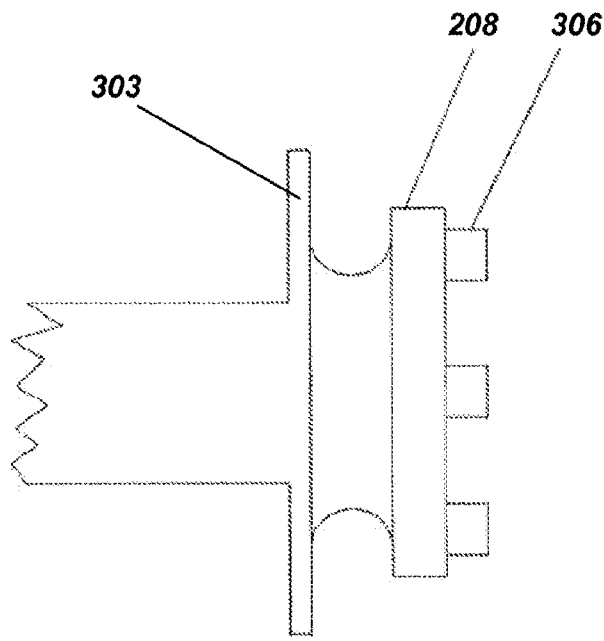

FIGS. 9A and 9B provide detail views of the wheel hub 208 of FIG. 7. FIG. 9A is rotated 90 degrees to provide a side view of the wheel hub 208 of FIG. 7, while FIG. 9B shows the view of the wheel hub 208 as in FIG. 7. The wheel hub 208 includes a plurality of drive pins 306. Although six drive pins 306 are illustrated, it is understood that other numbers of drive pins 306 arranged in a radially symmetric arrangement may be employed in other embodiments. Although the illustrated drive pins 306 are circular in cross section, it is understood that other shapes may be employed in other embodiments. The center hole 333 as shown in FIG. 9A is shaped to accommodate the axle shaft 206.

Figure 10A:
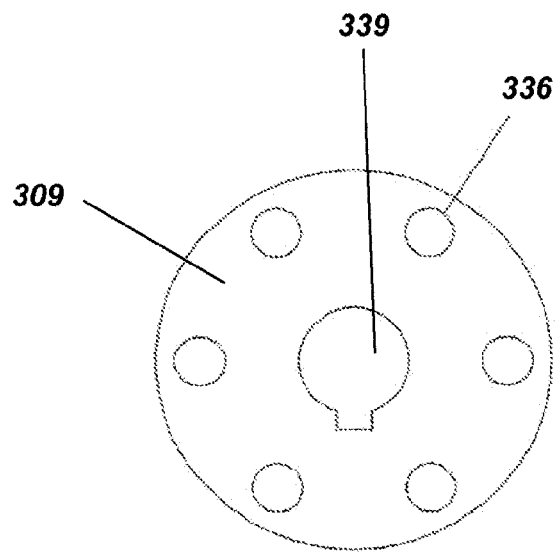
FIGS. 10A and 10B provide detail views of a drive plate of the positive traction gear assembly of FIG. 7.
Figure 10B:
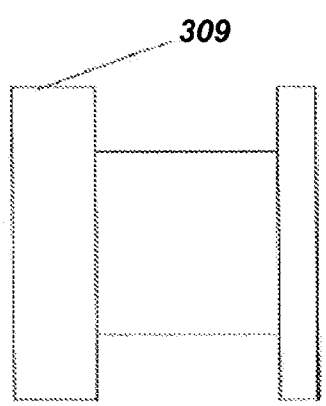

FIGS. 10A and 10B provide detail views of the drive plate 309 of FIG. 7. FIG. 10A is rotated 90 degrees to provide a side view of the drive plate 309 of FIG. 7, while FIG. 10B shows the view of the drive plate 309 as in FIG. 7. The drive plate 309 includes a plurality of drive holes 336 that are shaped to accommodate the drive pins 306. Although six drive holes 336 are illustrated, it is understood that other numbers of drive holes 336 arranged in a radially symmetric arrangement may be employed in other embodiments. Although the illustrated drive holes 336 are circular, it is understood that other shapes may be employed in other embodiments. The drive holes 336 may have the same or different shape as the drive pins 306, but the drive pins 306 are designed to fit within and lock to the drive holes 336. In some embodiments, there may be more drive holes 336 than drive pins 306. The center hole 339 as shown in FIG. 10A is shaped to accommodate the axle shaft 206 and keyed so as to remain locked to the axle shaft 206.

The operation of the positive traction gear assembly 300 will next be described. Initially, one wheel hub 208 may spin freely upon the axle shaft 206, while the other wheel hub 210 may be locked to the axle shaft 206. The axle shaft 206 is driven by way of the rear drive sprocket 204 as previously described. Thus, one balloon tire 202 is actively driven, while the other balloon tire 200 is not.

When a rider desires to activate positive traction and dual wheel drive, the rider may press a lever, release a lever, flip a switch, press a button, release a button, or perform another similar action. The action results in the cable 321 being mechanically pulled, either by the rider or by a motor. The pulling of the cable 321 causes the pivot arm 312 to rotate about the pivot point 318, which applies pressure to the drive plate 309, via the bearing 315, to cause the drive plate 309 to move along the axle shaft 206 toward the wheel hub 208. The drive plate 309 then locks to the wheel hub 208, via the drive holes 336 mating with the drive pins 306. As the drive plate 309 is rotationally locked to the axle shaft 206, the wheel hub 208 (and by extension the balloon tire 200) also becomes locked to the axle shaft 206. Accordingly, both the balloon tire 200 and the balloon tire 202 are actively driven.

When the rider desires to deactivate positive traction and return to single wheel drive, the rider may release a lever, press a lever, flip a switch, press a button, release a button, or perform another similar action. The action results in the tension on the cable 321 being released. Consequently, the action of the spring 327 in relation to the fixed arm and spring bracket 324 and the pivot arm 312 causes the pivot arm 312 to rotate about the pivot point 318 in an opposite direction. The pivot arm 312, via the bearing 315, causes the drive plate 309 to move away from the wheel hub 208, thereby releasing the wheel hub 208 from the drive plate 309 and allowing the wheel hub 208 to rotate freely about the axle shaft 206. Accordingly, the bicycle 10 is returned to single wheel drive, which may facilitate a decreased turning radius.

It is understood the positive traction gear assembly 300 may be used to activate or deactivate driving action for either left or right rear wheels of a bicycle 10. Further, some embodiments of bicycles may include multiple instances of the positive traction gear assembly 300 to control driving action for two or more rear wheels. Also, one or more of the rear wheels of the bicycle 10 may be permanently rotationally locked to the axle shaft 206.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

Therefore, at least the following is claimed:

1. A bicycle comprising:
    a front wheel;
    a plurality of rear wheels coupled to a rear axle driven by pedal power; and
    a positive traction gear assembly coupled to a particular rear wheel of the plurality of rear wheels, wherein the positive traction gear assembly is configured to facilitate selective activation of a single rear wheel drive or a multiple rear wheel drive for the bicycle, wherein the positive traction gear assembly includes:
        a drive plate that is keyed to the rear axle, the drive plate including a plurality of drive holes shaped to accommodate a plurality of drive pins;
        a wheel hub for the particular rear wheel configured to selectively lock or unlock to rotation of the rear axle, the wheel hub including the plurality of drive pins extending outwardly from the wheel hub and toward the drive plate;
        a pivot arm coupled to a bearing, the drive plate being coupled to the pivot arm by way of the bearing;
        a cable and a spring assembly configured to selectively actuate pivoting of the pivot arm in a first direction or a second direction;

wherein the plurality of drive pins are captured by the plurality of drive holes in order to lock rotation of the wheel hub to rotation of the drive plate when the multiple rear wheel drive is activated; and wherein pivoting by the pivot arm in the first direction is configured to move the drive plate toward the wheel hub, and pivoting by the pivot arm in the second direction is configured to move the drive plate away from the wheel hub.

2. The bicycle of claim 1, wherein the bicycle is non-motorized.

3. The bicycle of claim 1, wherein at least one of the plurality of rear wheels is permanently rotationally locked with the rear axle.

4. The bicycle of claim 1, wherein each of the plurality of rear wheels comprises a balloon tire.

5. The bicycle of claim 4, wherein each balloon tire of the plurality of rear wheels includes a plurality of transverse exterior ribs disposed about a circumference of each said balloon tire, and further including a plurality of annular ribs disposed around a periphery of each said balloon tire that extends radially above the plurality of transverse exterior ribs so that the plurality of transverse ribs do not touch a hard surface when the bicycle is driven over the hard surface, such that the bicycle may be ridden vibration-free over the hard surface with the plurality of annular ribs preventing the plurality of transverse exterior ribs from touching the hard surface.

6. The bicycle of claim 5, wherein the plurality of transverse exterior ribs extend between each said annular rib of each said balloon tire and further extend outwardly toward each sidewall of each said balloon tire so as to extend the plurality of transverse ribs outwardly beyond each outer-most said annular rib of each said balloon tire.

7. The bicycle of claim 4, wherein each balloon tire has a certain width and is inflated to a pressure to ride up and over loose sand, such that the bicycle can be started with minimal effort by a rider and such that forward motion of the bicycle on the loose sand is not impeded by a minimal penetration of each balloon tire into the loose sand.

8. A bicycle, comprising:
   a front wheel;
   a plurality of rear wheels coupled to a rear axle driven by pedal power, wherein each of the plurality of rear wheels comprises a balloon tire;
   means for selectively activating a single rear wheel drive or a multiple rear wheel drive for the bicycle;
   wherein each balloon tire of the plurality of rear wheels includes a plurality of transverse exterior ribs disposed about a circumference of each said balloon tire, and further including a plurality of annular ribs disposed around a periphery of each said balloon tire that extends radially above the plurality of transverse exterior ribs so that the plurality of transverse ribs do not touch a hard surface when the bicycle is driven over the hard surface, such that the bicycle may be ridden vibration-free over the hard surface with the plurality of annular ribs preventing the plurality of transverse exterior ribs from touching the hard surface; and
   wherein the plurality of transverse exterior ribs extend between each said annular rib of each said balloon tire and further extend outwardly toward each sidewall of each said balloon tire so as to extend the plurality of transverse ribs outwardly beyond each outer-most said annular rib of each said balloon tire.

9. The bicycle of claim 8, wherein the bicycle is non-motorized.

10. The bicycle of claim 8, wherein at least one of the plurality of rear wheels is permanently rotationally locked to the rear axle.

11. The bicycle of claim 8, wherein each balloon tire has a certain width and is inflated to a pressure to ride up and over loose sand, such that the bicycle can be started with minimal effort by a rider and such that forward motion of the bicycle on the loose sand is not impeded by a minimal penetration of each balloon tire into the loose sand.

12. The bicycle of claim 8, wherein the means for selectively activating the single rear wheel drive or the multiple rear wheel drive for the bicycle further comprises:
   a drive plate that is keyed to the rear axle, the drive plate including a plurality of drive holes shaped to accommodate a plurality of drive pins; and
   a wheel hub for a particular rear wheel of the plurality of wheels, the wheel hub being configured to selectively lock or unlock to rotation of the rear axle, the wheel hub including the plurality of drive pins extending outwardly from the wheel hub and toward the drive plate.

13. The bicycle of claim 12, wherein the means for selectively activating the single rear wheel drive or the multiple rear wheel drive for the bicycle further comprises a pivot arm coupled to a bearing, the drive plate being coupled to the pivot arm by way of the bearing.

14. The bicycle of claim 13, wherein the means for selectively activating the single rear wheel drive or the multiple rear wheel drive for the bicycle further comprises a cable and a spring assembly configured to selectively actuate pivoting of the pivot arm in a first direction or a second direction.

15. The bicycle of claim 14, wherein the plurality of drive pins are captured by the plurality of drive holes in order to lock rotation of the wheel hub to rotation of the drive plate when the multiple rear wheel drive is activated.

16. The bicycle of claim 14, wherein pivoting by the pivot arm in the first direction is configured to move the drive plate toward the wheel hub, and pivoting by the pivot arm in the second direction is configured to move the drive plate away from the wheel hub.

17. A method for using a positive traction gear assembly on a bicycle, the bicycle comprising:
   a front wheel;
   a plurality of rear wheels coupled to a pedal-powered rear axle; and
   the positive traction gear assembly coupled to a particular rear wheel of the plurality of rear wheels, wherein the positive traction gear assembly is configured to facilitate selective activation of a single rear wheel drive or a multiple rear wheel drive for the bicycle, wherein the positive traction gear assembly includes:
      a drive plate that is keyed to the rear axle, the drive plate including a plurality of drive holes shaped to accommodate a plurality of drive pins;
      a wheel hub for the particular rear wheel configured to selectively lock or unlock to rotation of the rear axle, the wheel hub including the plurality of drive pins extending outwardly from the wheel hub and toward the drive plate;
      a pivot arm coupled to a bearing, the drive plate being coupled to the pivot arm by way of the bearing; and
      a cable and a spring assembly configured to selectively actuate pivoting of the pivot arm in a first direction or a second direction; and
   the method comprising:
   activating a means for pulling the cable on the bicycle, whereupon pulling the cable is configured to cause the particular rear wheel to become rotationally locked with the pedal-powered rear axle; and activating a means for releasing tension on the cable, whereupon releasing tension on the cable is configured to cause the particular rear wheel to become unlocked from the pedal-powered rear axle.

18. The method of claim 17, further comprising pivoting the pivot arm of the positive traction gear assembly about a pivot point, whereupon the pivot arm is configured to push against the drive plate.

19. The method of claim 18, wherein the pivoting causes the pivot arm to push the drive plate toward the wheel hub.

20. The method of claim 18, wherein the pivoting causes the pivot arm to pull the drive plate away from the wheel hub of the particular rear wheel.

* * * * *